2,855,911
AIR COOLED TWO STROKE CYCLE DIESEL ENGINE

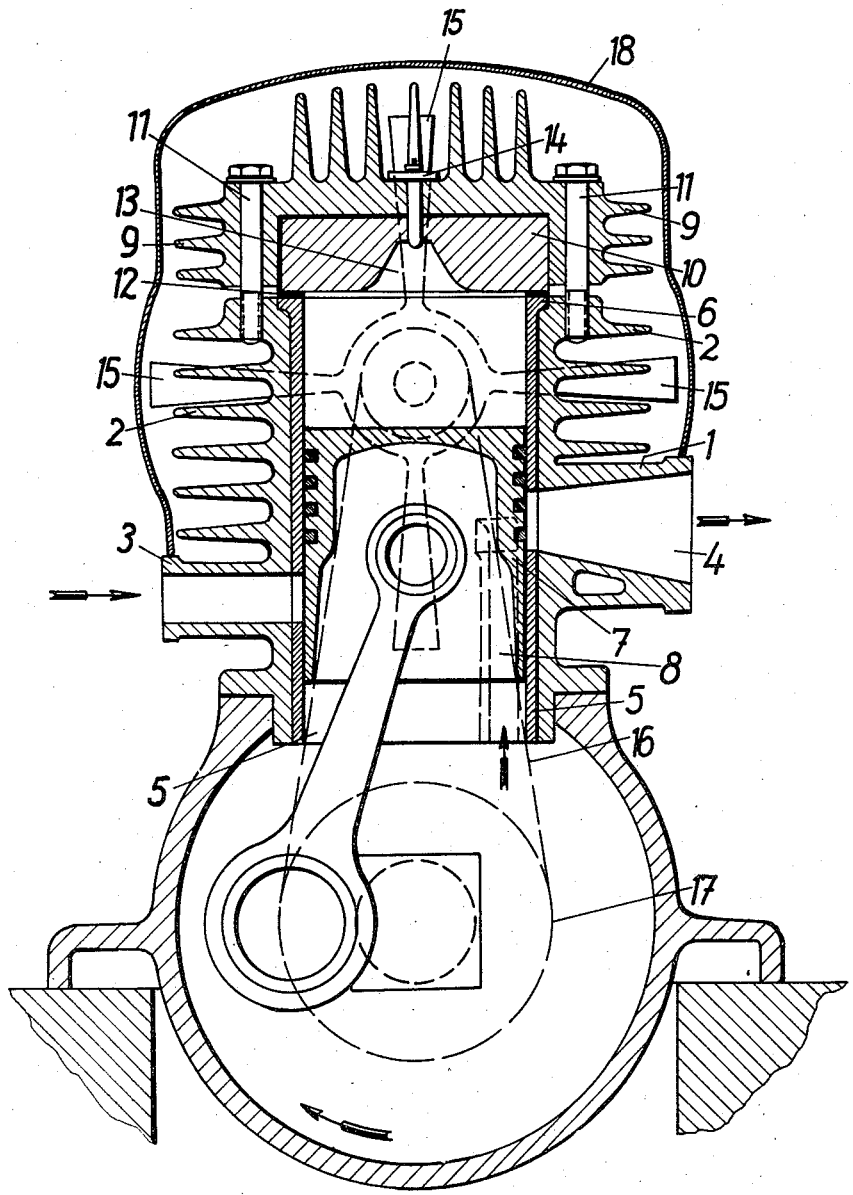

Heinrich C. Christiansen, Wedel, Holstein, Germany, assignor to Rockwell Gesellschaft mit beschrankter Haftung, Hamburg, Germany Application December 16, 1955, Serial No. 553,577

Claims priority, application Great Britain December 17, 1954

4 Claims. (Cl. 123—41.65)

The present invention relates to an air cooled diesel engine and, more specifically, to a two-stroke cycle air cooled diesel engine.

It is a well-known fact that principally the two-stroke cycle for small diesel engines is superior to the four-stroke cycle because four-stroke cycle engines have a more complicated construction, are more expensive than two-stroke cycle engines and already due to the required larger fly-wheel are considerably heavier than corresponding two-stroke cycle engines. Efforts made for providing a small two-stroke cycle diesel engine have, however, heretofore not yielded satisfactory results because these known small engines of the type referred to do not meet the requirements with regard to construction and operation.

It is, therefore, the primary object of the present invention to provide a small diesel engine which will overcome the above mentioned drawbacks.

It is another object of this invention to provide a small two-stroke cycle air cooled diesel engine which will be simple and relatively inexpensive as to construction and will be highly economical in operation.

These and other objects and advantages of the invention will appear more clearly from the following specification in connection with the accompanying drawing illustrating in section a small air cooled two-stroke cycle diesel engine according to the invention.

By "small diesel engine" is meant an engine up to 10 horse power.

According to the present invention, the small diesel engine is a two-stroke cycle air cooled diesel engine which is provided with a crank case pump, i. e. the crank case and the piston or pistons in the diesel engine together form a pump for scavenging the engine in conformity with the reverse scavenging process; the diesel engine operates with direct fuel injection. The cylinder or cylinders consist of light metal and are provided with a cast iron liner while the cylinder heads which likewise consist of light metal are provided with an inner liner of heavy metal, e. g. of steel, cast steel or cast iron.

The employment of the two-stroke cycle process and air cooling yields the desired relative inexpensiveness and simplicity as to the construction of the engine and enlarges its possibility of employment inasmuch as the engine is independent of cooling water and thus is better transportable and can be better employed in cold weather and cold areas. Expediently, a blower is provided for furnishing the cooling air so that also at higher outer temperatures a proper heat transfer will be assured. In this connection axial blowers have proved particularly advantageous because they are superior to other blowers with regard to required space, weight and design and therefore better meet the requirements which are to be met in conformity with the present invention.

The requirement for simplicity and low cost is also furthered by the crank case scavenging. This type of scavenging generally has the drawback that it yields a rather moderate delivery rate only. Therefore, when used in connection with two-stroke cycle diesel engines it leads to an incomplete removal of the residue gases, and to a too low quantity of excess air and also produces high temperatures in the wall of the combustion chamber so that incomplete combustion, low output, high fuel consumption, smoking discharge, quick soiling, and short life will result. These drawbacks of the heretofore customary small two-stroke cycle diesel engines with crank case scavenging have been overcome according to the invention by employing in combination with other features a scavenging method with a maximum degree of efficiency namely the reverse scavenging method. This type of scavenging assures that the exhaust gas is better removed from all parts of the combustion chamber so that the necessary excess in air will be assured. This, however, is possible only when also the combustion chamber is correspondingly designed. With pre-chamber scavenging diesel engines, a satisfactory scavenging of the antechamber is practically impossible so that due to the not very thorough scavenging by crank case pumps in connection with two-stroke cycle diesel engines a considerable drop in the output and a considerable increase in fuel is unavoidable. To overcome this drawback, according to the present invention direct fuel injection is employed which operates in combination with a recess and crevice-free combustion chamber while completely avoiding antechambers and air storage chambers or air cells. If desired, the formation of the mixture could be effected while employing an air cell which has such a small volume with regard to the volume of the combustion chamber that it will practically not at all affect the scavenging.

The combination according to the invention of a two-stroke cycle with crank case pump, reverse scavenging, direct fuel injection, and air cooling also requires a proper mastering and conduction of the temperature of the combustion chamber wall. This requirement is met according to the present invention by the design of the wall of the combustion chamber. According to a further feature of the invention, the good heat conductivity of the light metal is made use of to maintain the wall temperature of the cylinder and cylinder head within safe limits in spite of the employment of air cooling. On the other hand the cylinder head is protected by a heavy metal liner, while the cylinder mantle is protected by a liner of cast iron so that simultaneously the better running properties of cast iron over those of light metal are made use of for the guiding of the piston.

The combination according to the invention of all the various above mentioned features results in a two-stroke cycle diesel engine which meets all legitimate requirements.

Referring now to the drawing showing a single cylinder engine of the invention in section, this engine compirses a light metal cylinder 1 provided with cooling fins 2, an air intake connection 3 and a discharge connection 4. The cylinder 1 has pressed or shrunk therein a liner 5 of cast iron the flange 6 of which is fitted in a corresponding recess of the cylinder end surface. The piston 7 controls in a manner customary with two-stroke cycle engines the intake and outlet slots of the cylinder and the opening of the transfer port 8 for the scavenging air compressed in the crank case.

The cylinder head 9 likewise provided with cooling fins also consists of light metal and is provided with a heavy metal liner 10 which covers the cylinder head 9 with regard to the combustion chamber. Those surfaces of the liner 10 and the cylinder head 9 which face each other are similar to those of the cylinder 1 and its liner 5 so dimensioned and machined that they firmly rest against each other and that an unimpeded heat transfer is assured between the heavy metal directly exposed to the combustion chamber temperature and the light metal swept by the cooling air.

With the embodiment shown in the drawing, the liner 10 is fitted into the light metal head with cylindrical or slightly conical circumference. The liner 10 has its plane outer end surface in engagement with the cylinder head and is so dimensioned and drawn tight to the cylinder head by means of bolts 11 and, if desired also by means of a gasket 12 that the liner 10 is clamped against the liner 5 so that it will seal therewith and will be pressed into the cylinder head. In this way, the clamping studs or bolts 11 particularly firmly press the liner 10 against the cylinder head, thereby assuring a proper heat exchange between the said two parts. The liner 10 could, of course, also be shaped differently from how it appears in the drawing. For instance the lateral contacting surfaces between the liner and the cylinder head could be more or less rounded or the liner could have a calotte shaped, semi-spherical or the like contour. However, it is always essential that the liner is so designed that when the latter is pressed into the cylinder head it will by means of studs 11 yield the desired intimate contact with the correspondingly shaped inner wall of the cylinder head.

According to the drawing, injection nozzle 14 has its mouth located in a conically widening recess 13 which is easily accessible by the flow of scavenging air. The recess 13 forming part of the combustion chamber is located in the liner 10, may be shaped in any standard manner and may be designed as air storage chamber. It is merely essential that the combustion chamber can be swept entirely, or nearly so, by the scavenging air without being impeded. As will be clearly evident from the drawing, the combustion chamber throughout its entire length is free from dead corners and consequently can be properly and continuously swept by the scavenging air produced by the crank case pump. The flow of scavenging air is covered toward all sides by the liner 5 and the liner 10 in such a manner that the light metal of the cylinder and cylinder head is protected against the direct effect of the combustion process. Due to the particularly intimate contact of the heavy metal with the light metal in accordance with the invention, the heat is properly transfered from the combustion chamber walls toward the outside where it is taken up by the cooling air flow.

The cooling air flow is produced by the diagrammatically illustrated axial blower the rotor 15 of which is driven by the disc 17 of the crank shaft through the intervention of the belt 16. The positive guiding of the cooling air is effected in a manner known per se by baffle plates and the hood-like cowl 18 which surrounds the rotor 15 and the cylinder to be cooled.

It is, of course, understood that the present invention is, by no means, limited to the particular construction shown in the drawing but also comprises any modifications within the scope of the appended claims.

What I claim is:

1. In combination in a small air cooled two-stroke cycle diesel engine with direct fuel injection: a cylinder made of light metal and having a liner of heavy metal, a cylinder head connected to said cylinder, said cylinder head being made of light metal and having a liner of heavy metal, crank case pumping means for furnishing scavenging air, and conduit means arranged to convey scavenging air from said crank case pumping means to said cylinder for loop scavenging.

2. An air cooled two-stroke cycle diesel engine according to claim 1, which includes axial blower means for conveying cooling air around said cylinder and said cylinder head.

3. In combination in a small air cooled two-stroke cycle diesel engine with direct fuel injection: a cylinder made of light metal and having a liner of heavy metal, a cylinder head made of light metal and having a liner of heavy metal, connecting bolts extending through said cylinder head into said cylinder for connecting said cylinder head to said cylinder while simultaneously pressing the liner in said cylinder head firmly against said cylinder head, crank case pumping means for furnishing scavenging air, and conduit means arranged to convey scavenging air from said crank case pumping means to said cylinder for loop scavenging.

4. A diesel engine according to claim 3, in which the heavy metal liner of said cylinder head extends transversely to the liner of said cylinder and is provided with a recess widening toward said cylinder, said heavy metal liner of said cylinder head having a bore therethrough communicating with said recess, and a fuel injection nozzle extending through said bore into said recess.

References Cited in the file of this patent

UNITED STATES PATENTS

| | | |
|---|---|---|
| 785,687 | Tuck et al. | Mar. 21, 1905 |
| 972,409 | Swain | Oct. 11, 1910 |
| 1,110,332 | Miller | Sept. 15, 1914 |
| 2,670,726 | Spannhake | Mar. 2, 1954 |
| 2,737,171 | Torre | Mar. 6, 1956 |

FOREIGN PATENTS

| | | |
|---|---|---|
| 1,066,629 | France | Nov. 17, 1952 |
| 1,067,382 | France | Dec. 2, 1952 |